Dec. 4, 1934.  M. MERTA  1,982,921

FILM MOVING MECHANISM

Filed Jan. 14, 1933   2 Sheets-Sheet 1

Inventor
Method Merta
by John F. Brezina
His Attorney

Dec. 4, 1934.   M. MERTA   1,982,921

FILM MOVING MECHANISM

Filed Jan. 14, 1933   2 Sheets-Sheet 2

Inventor
Method Merta
by John F. Brezina
His Attorney

Patented Dec. 4, 1934

1,982,921

UNITED STATES PATENT OFFICE 1,982,921

FILM MOVING MECHANISM

Methed Merta, Chicago, Ill.

Application January 14, 1933, Serial No. 651,836

6 Claims. (Cl. 74—69)

This invention relates to a novel device of the class hereinafter described particularly adapted for operation as a part of a moving picture projector, and is directed to novel means for imparting horizontal and vertical movements to a film moving member, and to novel means of transmitting power from a pulley or the like to cause an axle shaft to rotate at varying speeds during each cycle, the particular objects of which will be more fully set forth in the following objects.

This application is somewhat related to my copending application for patent, Serial No. 641,-145, but this application embodies new combinations and novel features not previously disclosed.

An important object of this invention is the provision of a novel, compact and practical construction embodying a pulley, a rotatable shaft journalled non-concentric therewith, and means rotatively connecting the same, whereby the shaft will be rotated at varying speed in comparison with a substantially uniform speed of the pulley, said means being particularly adaptable for use to impart desired movement to a film moving element or the like.

A further important object of my invention is to provide a mechanism which will transmit rotative movement into vertical and horizontal movement of a film engaging member which will move horizontally in and out of a perforated film and vertically downwardly to move the film and vertically upwardly to starting position, all with substantially no vibration or noise.

A further important object of my invention is the provision of cam means adapted to transmit rotative movement from a rotatable shaft to a film engaging member whereby said member is moved horizontally, and separate concentric cam means for moving said member vertically.

A further important object of my invention is the provision of novel means for rotatively connecting a pulley and a non-concentric shaft whereby varied speed will be imparted to such shaft upon rotation of the pulley.

Other and further objects of this invention will be apparent from the disclosures in the specification and the accompanying drawings.

This invention (in a preferred form) is illustrated in the drawings and hereinafter more fully described.

Figures 1, 2:
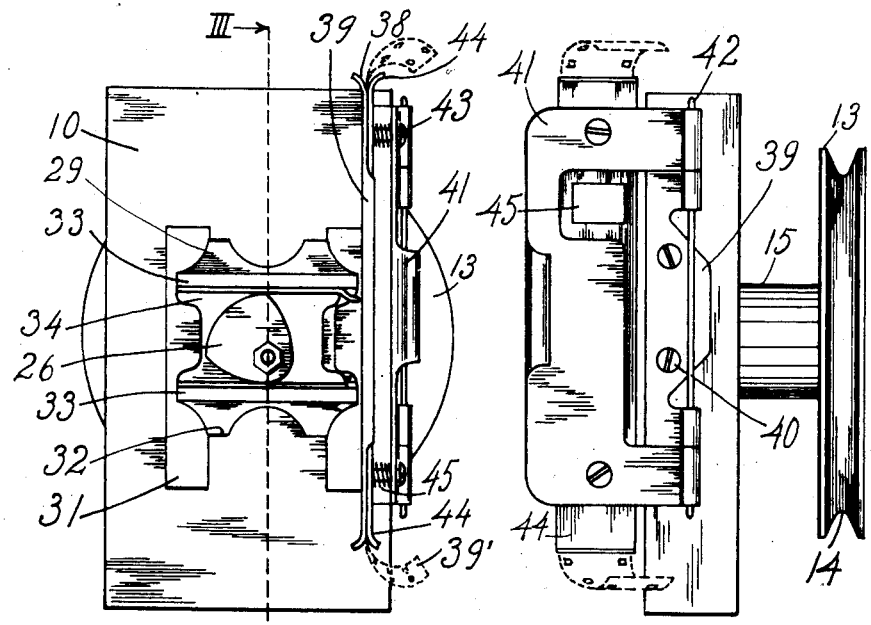
Fig. 1 is a side elevational view of my film moving mechanism which forms a part of a motion picture film projector and illustrates the features adapted to move the film moving member vertically.
Fig. 2 is a front elevation of the mechanism shown in Fig. 1.
Figure 9:
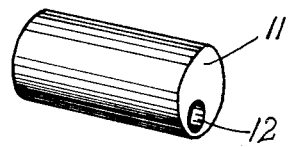
Fig. 9 is a perspective view of the cylindrical bearing block in which the cam shaft is rotatable.

The reference numeral 10 indicates the mounting block of my device which is adapted to be suitably secured in a head of a film projection machine of any conventional construction and in such a position that the film guide means illustrated in Figs. 1 and 2 hereof will be positioned for convenient passage therethrough of the film which passes from one rotating film spool to the other (not shown). Said block 10 has a suitable aperture therein (not shown) in which is securely mounted one end of a cylindrical block 11 shown in perspective in Fig. 9, and as shown in cross section in Fig. 3. Cylinder block 11 has a longitudinal aperture therethrough adjacent its periphery and non-concentric therewith as clearly shown in Fig. 9, said aperture and cylinder providing journalling means for a rotatable element hereinafter described.

The reference numeral 13 indicates a pulley wheel having an annular central hollow portion as indicated, and a suitable peripheral groove 14 for suitable engagement of a moving belt attached to any conventional power means, preferably an electric motor. A suitable annular recess 16 is formed on the outer periphery of the pulley 13 which is adapted to snugly seat a removable metal cover 17, as clearly indicated in Figs. 3 and 4. The pulley 13 has a perpendicularly extending hub 15 which fits snugly about the projecting end of the cylinder block 11 and is rotatable thereon, said hub being of a length so that the inner surface of the pulley 13 will be in substantially the same plane as the end of the cylinder 11, as clearly indicated in Fig. 3. An important feature of my invention consists of the compactness and arrangement of parts by which variable rotation is imparted to the film moving mechanism from rotation of the pulley 13. This mechanism, which is entirely in the hollow portion of the pulley wheel 13 and beneath the metal cover 17, will now be described.

Figures 3, 4:
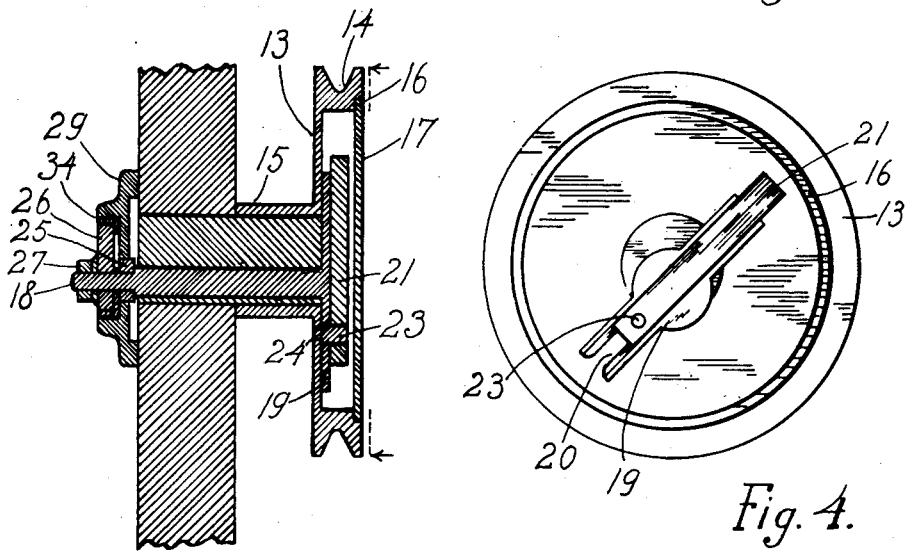
Fig. 3 is a cross sectional view taken on line III—III of Fig. 1.
Fig. 4 is a side elevational view showing the interior of the pulley and the slidable connection.
Figure 8:
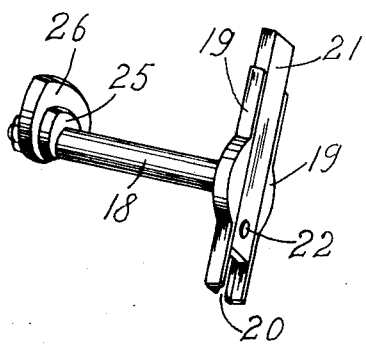
Fig. 8 is a perspective view of the cam shaft, cams and slidable connection of my device.

An axle shaft 18, clearly shown in perspective in Fig. 8, is rotatably journalled in the aperture 12 of cylinder 11 in the manner indicated in Fig. 3 and has secured to one end thereof and perpendicular thereto a channel member 19, the channel opening outwardly. One end of said channel member 19 is bifurcated by a longitudinal slot 20 midway between its sides. A rectangular block, 21, which may be of fiber or other suitable material and of a size adapted to slide within said channel member 19, is slidably mounted in said channel as clearly indicated in Figs. 4 and 8. Said block 21 has an aperture 22 in one end thereof which rotatably engages the outer end of a pin 23, the other end of said pin being securely riveted in a suitable aperture in the pulley 13, as indicated at 24, and the intermediate portion of said pin slidably engaging the slot 20 of channel member 19. It will be apparent that normal and substantially uniform rotation of the pulley 13 will rotate shaft 18, channel member 19 and block 21 at varied speed during each rotation thereof and due to the nonconcentric journalled position of the shaft 18 with respect to the axis of the pulley, the pin 23 will form a nonconcentric path about the axis of shaft 18 and pass nearer to said axis on one side and gradually farther away, and then closer on the opposite side, thereby causing block 21 to slide back and forth. It will be readily apparent that the ratio of rotation and the variable speeds of shaft 18 may be changed by merely changing the position of the aperture 12 in the cylinder 11.

As indicated in Figs. 3 and 8, the end of the shaft projecting from the side of the mounting block 10 opposite to the pulley 13 is slightly reduced to form an annular shoulder with the main shaft portion. A relatively small substantially triangular cam 25 and a larger triangular cam 26 are securely mounted on the reduced end of shaft 18 by means of a washer and nut 27 which threadingly engages said shaft and as clearly shown in Figs. 3 and 8. A spacing washer 28 is interposed between said cams 25 and 26 to maintain alignment of said cams with mechanical parts which they contact.

Figure 5:
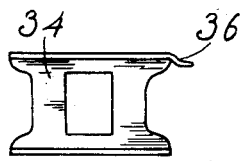
Fig. 5 is a front elevational view of the film engaging member which is operated by the cams.
Figure 6:
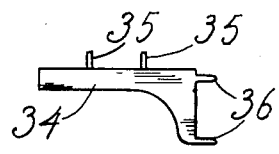
Fig. 6 is a view taken from the top showing the cam engaging flanges of the film engaging member.
Figure 7:
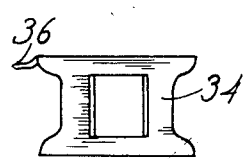
Fig. 7 is an elevational view of the reverse side of said member.

A supporting frame 29, preferably made of fibre, has a pair of parallel spaced apart guide flanges 32 formed integral with the under surface thereof, said guide flanges 32 being adapted to slidably engage respective opposed longitudinal edges of guide strips 31 secured in parallel relation on the face of mounting block 10 as clearly indicated in Fig. 1. Said frame 29 has a central rectangular aperture (not shown) through which shaft 18 extends and also has a pair of parallel spaced apart horizontal guide flanges 33 on the forward face thereof forming opposed right angled shoulders with the intermediate portion of the forward face thereof. A substantially rectangular channel-like film engaging element 34 shown in the three different views of Figs. 5, 6 and 7 respectively, has a relatively large square aperture in the center as indicated and has a pair of rearwardly extending flanges 35 formed integral with opposed vertical edges of the aperture thereof. The movable element 34 is moved in a rectangular path to intermittently engage and disengage a perforated film of conventional construction. As is indicated in Fig. 6, the element 34 has the upper flange thereof projected horizontally at the end adjacent the film, which flange has formed integral therewith a pair of pins 36 which are spaced apart a distance to conform to the perforations of the film, depending upon the size of the film used. The member 34 is slidably positioned between the flanges 33 of the frame member 29, the corners thereof fitting snugly in the corners formed by the flanges 33 and frame 29. The distance between the flanges of the frame member 29 is such that the cam 26 will rotate snugly therein as illustrated in Figs. 1 and 10 to 13 inclusive, and the distance between the vertical flanges 35 is such that the smaller cam 25 will snugly rotate therebetween to cause horizontal movement of said member 34.

A very important feature in the construction of my film moving mechanism is the absence of noise, vibration and unnecessary moving parts which have a very undesirable effect upon the reproduction of a film, particularly due to the vibration imparted by various conventional constructions to the film. The important feature of the construction which I have just described resides in the elimination of the unnecessary horizontal distance of travel of the film moving member 34, which is characteristic of my previous construction. As it is only necessary that the film moving member 34 move a very short distance sufficient to move the pins 36 in and out of the perforations in the moving film, the feature of construction herein described embodies only such horizontal movement as will move the member 34 and its integral film engaging pins just enough out of the film to permit free vertical movement of the film, thus eliminating all vibration and unnecessary movement. The film guiding means illustrated in Figs. 2 and 3 through which the film 37 is adapted to slide comprises a guide plate 38 which has longitudinal side guide flanges 39 forming guiding means for the film 37, and one edge thereof extends horizontally to form a suitable ear 39 which is securely fastened to the mounting block 10 by means of suitable screws 40 as indicated in Fig. 2. Upper and lower hinge knuckles are formed along said edge of said guide plate 38 to which a U-shaped film gate 41 having corresponding hinge knuckles is adapted to be hingedly secured by means of a pintle 42. Yieldably mounted with respect to the film gate 41 by means of a pair of spaced apart headed screws 43 which are slidable in suitable apertures formed in the film gate, is the film guide member 44, one side of which is adapted to yieldably rest against the guide plate 38. Coil springs 45 are mounted about the screws 43 to normally hold the guide plate 44 in yielding contact with the film 37 which slides between said guide plates. The ends of said guide members are preferably bent transversely in opposite directions as indicated in Fig. 1. Both the guide members 38 and 44 and the film gate 41 have a rectangular aperture 45 formed therein as indicated in Fig. 2 through which the light of the motion picture projector is projected.

In the operation of my film moving mechanism the pulley 13 is rotated, as hereinbefore stated, at substantially normal speed by a suitable motor (not shown), thereby imparting gradually increasing and decreasing rotating movement to the shaft 18 and cams 25 and 26 thereon. The cam 26 is so positioned on the shaft 18 that in the beginning of a cycle of rotation the cam 26 has raised both the frame 29 and member 34, the inner flanges of said frame sliding along said guide strips 31. The relative position of the smaller cam 25 with respect to cam 26 is such that upon elevation of said frame and member, said smaller cam will engage one of the flanges 35 to cause horizontal movement of the member 34 and its film engaging pins into the film, and thereupon the larger cam engages the lower flange of member 34 to cause downward vertical movement of the frame 29 and member 34, moving the film therewith; this downward movement being at a much greater speed than the movement of either the frame 29 in upward direction or of the member 34 in horizontal direction because in this position the slidable block 21 will be in a position wherein the pin 23 will be traveling through the arc nearest to the axis of the shaft 18.

Figure 10:
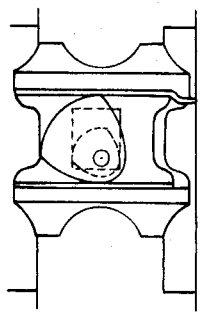
Figs. 10, 11, 12 and 13 are views showing schematically four consecutive positions of the film engaging member and associated parts in a single cycle.
Figure 11:
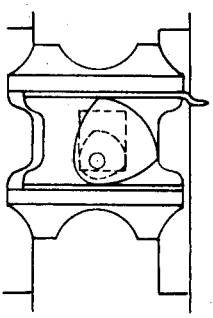
Figure 12:
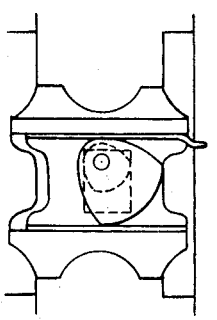
Figure 13:
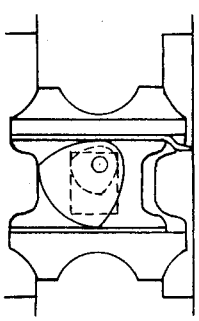

Upon further rotation representing the movement between the positions illustrated in Figs. 12 and 13, the film moving member 34 is moved horizontally out of the film with its pins being withdrawn from engagement with the film. The upward movement taking place between the positions represented in Fig. 13 and Fig. 10 is caused by engagement of the larger cam 26 to the beginnig of the cycle.

The afore-mentioned construction and operation permits an operation which is quiet, economical and satisfactory in every respect, there being no vibration of any sort imparted either to the mechanism or to the traveling film due to frictional or incorrect angular movement of the film engaging pins.

I am aware that many changes may be made and numerous details of the invention and construction thereof may be varied through a wide range without departing from the principles of this invention, and I therefore do not desire to limit the patent granted thereon otherwise than necessitated by the prior art.

I claim as my invention:

1. Means for rotating a shaft at variable speed during each cycle comprising a pulley adapted to be rotated from a power source and having its annular grooved periphery projecting perpendicularly to the plane thereof to form an annular housing; a stationary member on which said pulley is journalled; an axle shaft rotatably journalled in said stationary member nonconcentrically with said pulley; a slotted channel member secured on the end of said axle shaft and having one end bifurcated and lying in a plane adjacent to and parallel to said pulley; a block slidable in said channel member; a pin secured in said pulley rotatable in said block and adapted to slide in said slot formed by said bifurcated end of said channel member, the rotation of said pulley being adapted to cause repeated sliding movement of said block to rotate said axle at varying speeds during each cycle.

2. Mechanical means for transmitting uniform rotative movement to variable rotative movement, comprising a rotatably mounted pulley having an open side and a hollow portion; mounting means therefor including a projecting stub axle; an axle shaft rotatably mounted in said stub axle and non-concentric with said pulley, one end of said shaft projecting within the hollow portion of said pulley; a grooved member secured intermediate its ends to said end of said shaft and movable within said hollow portion of said pulley, one end of said member being bifurcated; a block slidable in said grooved member, and a pin secured in said pulley and extending through said bifurcation and rotatably engaging said block, the rotation of said pulley thereby being adapted to cause rotation of said axle shaft at variable speed during each cycle.

3. In a mechanism for moving film in a projector head, a rotatable shaft; mounting means wherein said shaft is journalled; a channel member on one end of said shaft substantially perpendicular thereto and having a longitudinal slot therein; a block slidable in said channel; a pulley rotatably mounted about said channel member; a pin secured in said pulley and slidably engaging said groove and rotatably engaging said block whereby the rotative movement of said pulley is transmitted to said axle to cause rotation of said axle at varying speeds during each cycle.

4. In a mechanism for transmitting power from a substantially uniform speed to a varied speed during each cycle, a rotatable pulley having its annular grooved portion extending perpendicular thereto and forming a hollow casing, a cover plate removably mounted on said hollow casing; a shaft journalled non-concentrically with said pulley; a channel member secured perpendicularly to one end of said shaft and comprising diametrically opposed arms, said channel member having a slot therein; a block slidable in said channel member, and a pivot secured in said pulley and rotatably engaging said block and adapted to slide in said channel slot, the rotation of said pulley being adapted to impart varied rotation of said shaft.

5. In a mechanism for intermittently moving film and transmitting variable movement thereto, a rotatable pulley having its periphery extending perpendicularly to the plane thereof and having an outer annular groove; a cover plate removably mounted on said periphery, said pulley and cover plate forming a housing; a shaft mounted rotatably and non-concentrically with respect to the axis of said pulley; a channel member on said shaft and perpendicular thereto and within said housing; a block slidable in said channel member; and a pin in said pulley and rotatably engaging said block.

6. Mechanical means for transmitting uniform rotative movement to variable rotative movement, comprising a rotatable pulley having a hollow portion; mounting means therefor comprising a projecting stub axle, said pulley having a central flange journalled about said stub axle; an axle shaft rotatably mounted in said mounting means and non-concentric with said pulley, one end of said shaft extending through said pulley; a grooved member secured intermediate its ends to said end of said shaft, one end of said member being bifurcated; a block slidable in said grooved member; and a pin secured in said pulley and extending through said bifurcation and rotatably engaging said block, the rotation of said pulley thereby being adapted to cause rotation of said axle shaft at variable speed during each cycle, said channel member and pivotal connection being within said pulley.

METHOD MERTA.